United States Patent [19]

Jennings, Jr.

[11] Patent Number: 4,605,061
[45] Date of Patent: Aug. 12, 1986

[54] APPARATUS FOR PLUGGING A WELLBORE IN HIGH IMPULSE FRACTURING

[75] Inventor: Alfred R. Jennings, Jr., Plano, Tex.

[73] Assignee: Mobil Oil Corporation, New York, N.Y.

[21] Appl. No.: 625,429

[22] Filed: Jun. 28, 1984

[51] Int. Cl.⁴ .................. E21B 33/134; E21B 43/263
[52] U.S. Cl. .................................. 166/63; 166/65.1; 166/72; 166/177; 166/287; 166/289
[58] Field of Search ................ 166/63, 72, 177, 281, 166/285, 286, 287, 294, 295, 299, 308, 376, 381, 65.1

[56] References Cited

U.S. PATENT DOCUMENTS

| | | | |
|---|---|---|---|
| Re. 21,356 | 2/1940 | Pitzer ................................. | 166/299 |
| 2,911,046 | 11/1959 | Yahn ................................. | 166/285 |
| 3,070,163 | 12/1962 | Colby et al. ....................... | 166/295 |
| 3,561,532 | 2/1971 | Fletcher ............................. | 166/299 |
| 3,587,744 | 6/1971 | Spencer et al. .................... | 166/299 |
| 3,690,378 | 9/1972 | Land ................................. | 166/299 |
| 3,727,690 | 4/1973 | Munson ......................... | 166/299 X |
| 3,831,383 | 8/1974 | Crank ............................. | 166/295 X |
| 4,039,030 | 8/1977 | Godfrey et al. ............... | 166/177 X |

Primary Examiner—George A. Suchfield
Attorney, Agent, or Firm—Alexander J. McKillop; Michael G. Gilman; Charles A. Malone

[57] ABSTRACT

An apparatus for plugging a wellbore with a solid gel plug stem in high impulse or high energy fracturing. This apparatus facilitates the removal of the propellant canister support means, the propellant ignition means, as well as any debris adhering thereto. By this apparatus, damage to the wellbore and formation is minimized.

16 Claims, 2 Drawing Figures

U.S. Patent  Aug. 12, 1986  4,605,061

APPARATUS FOR PLUGGING A WELLBORE IN HIGH IMPULSE FRACTURING

FIELD OF THE INVENTION

This invention is directed to an apparatus for facilitating the removal of debris when a canister containing a propellant is ignited in a wellbore during controlled pulse fracturing or high energy gas fracturing.

BACKGROUND OF THE INVENTION

Stimulation of wells through mechanical fracturing can be accomplished by a method known as controlled pulse fracturing or high energy gas fracturing. A good description of this method appears in an article by Cuderman, J. F., entitled "High Energy Gas Fracturing Development," Sandia National Laboratories, SAND 83-2137, October 1983. Using this method enables the multiple fracturing of a formation or reservoir in a radial manner which increases the possibility of contacting a natural fracture. In the practice of this method, a canister containing a propellant is suspended into a wellbore. This canister is placed downhole next to the oil or hydrocarbonaceous fluid productive interval.

The propellant in the canister can belong to the modified nitrocellulose or the modified and unmodified nitroamine propellant class. Suitable solid propellants capable of being utilized include a double-based propellant known as M-5. It contains nitroglycerine and nitrocellulose. Another suitable propellant is a composite propellant which contains ammonium perchlorate in a rubberized binder. The composite propellant is known as HXP-100 and is purchasable from the Holex Corporation of Hollister, Calif. M-5 and HXP-100 propellants are disclosed in U.S. Pat. No. 4,039,030 issued to Godfrey et al. which is hereby incorporated by reference.

After placing the propellant means for creating multiple fractures into a canister and suspending it downhole near the oil or hydrocarbonaceous fluid productive interval, it is ignited. Ignition of the propellant means for creating the multiple fractures causes the generation of heat and gas pressure. To contain the generated propellant energy within the wellbore and formation, an aggregate stem, generally composed of cement, is placed above the canister containing the propellant thereby sealing the wellbore. The canister suspension and ignition means passes through the aggregate stem.

After ignition of the propellant means it is difficult to remove the aggregate stem, which often has to be drilled out. When removing the aggregate stem, the suspension means, generally a cable, and the ignition means, along with remnants of the canister which previously contained the propellant, frequently fall into the wellbore. This debris may interfere with production of hydrocarbonaceous fluids from the formation. Drilling out the aggregate often damages the wellbore and formation.

SUMMARY OF THE INVENTION

Therefore, it is necessary to have an apparatus to facilitate removing the canister suspension and ignition means from the wellbore. It is also necessary to have a device to prevent damaging the wellbore when removing the stem.

The present invention discloses an apparatus for sealing a wellbore with a pumpable gel mixture capable of solidifying after placing a canister containing a propellant therein into the wellbore. Upon solidifying, the solid gel is able to withstand the energy released from the ignited propellant.

In the practice of this invention, a means for containing the pumpable gel mixture is placed into the wellbore at a predetermined level, generally at the hydrocarbonaceous productive fluid interval. Afterwards, the gel mixture is pumped into the wellbore above the means for containing the pumpable mixture. Subsequently, the gel mixture is caused to become a solid sufficient to withstand the energy released from the ignited propellant.

After ignition, and when conditions in the wellbore and formation have reached the desired level of stability, the solidified gel plug can be removed by either chemical or physical means.

It is therefore an object of the present invention to provide an apparatus to facilitate removal of the canister suspension and ignition means, along with any canister remnants, from the wellbore.

It is another object of this invention to provide a device which will facilitate the removal of the gel plug or stem after ignition of the propellant.

Yet another object of this invention is to provide an apparatus which will facilitate varying the density of the gel plug or stem to increase its strength.

Still yet another object of the present invention is to minimize damage to a wellbore or formation when removing the gel plug or stem.

A further object of the present invention is to provide for an apparatus which will allow for variations in the stability and rigidity of the gel plug or stems as required.

DESCRIPTION OF PREFERRED EMBODIMENTS

Figure 1:
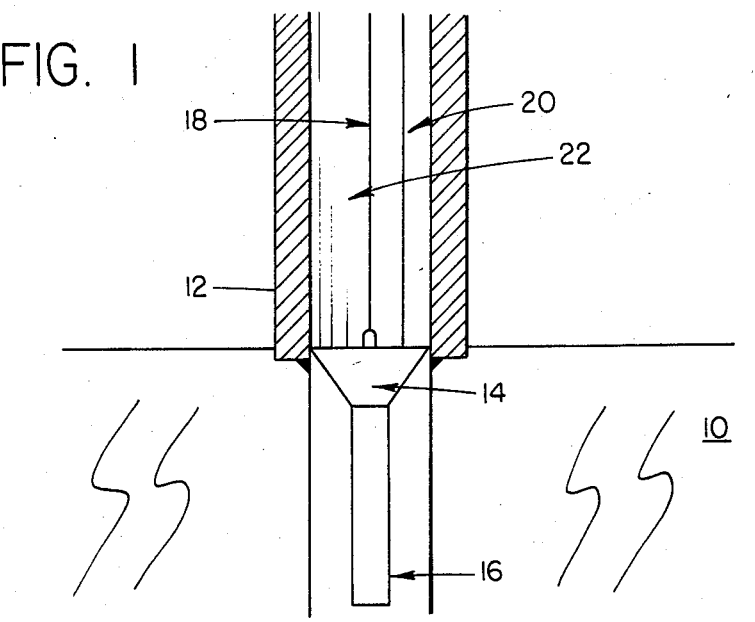
FIG. 1 is a graphic representation of the gel plug and canister containing the propellant before ignition.

In the practice of this invention, referring to FIG. 1, a canister containing a propellant 16 is placed into a wellbore 12 which penetrates a hydrocarbonaceous fluid producing formation 10. Canister 16 is suspended into the wellbore 12 via a retrieval means, which generally will be a cable 18. In order to ignite the propellant contained in the canister 16, a means for igniting the propellant is connected to the retainer stem 14. The retainer stem 14 forms an integral part of the canister and is positioned on its upwardly directed end. The other end of the means for ignition is connected or affixed to a location at or above ground level above wellbore 12. The means for ignition will generally be a conduit 20 containing an electrical wire which wire can be used to generate an electrical spark within the canister 16 containing the propellant.

After positioning the retainer stem 14 at the desired level in the wellbore, a pumpable gel mixture is placed into the wellbore above the retainer stem 14. After from about 2 hours to about 4 hours, the pumpable gel mixture solidifies. As will be understood by those skilled in the art, the composition of the mixture can be varied to obtain the desired rigidity in the gel stem. One method of making a suitable pumpable mixture is discussed in U.S. Pat. No. 4,333,461 issued to Muller on June 8, 1982 which is hereby incorporated by reference. Upon solidification, the pumpable gel mixture forms the gel plug stem 22. The stability and rigidity of the gel plug stem 22 will depend upon the physical and chemical characteristics of the gel plug stem. As is known to those skilled in the art, the gel plug stem should be of a stability and rigidity which will absorb the shock from ignition of the propellant contained in the canister 16. Generally these pressures generated upon ignition will vary from about 10,000 psig to about 80,000 psig. Instantaneous heat generated upon ignition of the propellant may be greater than about 1,000° F. in the vicinity of the deflagration but is quickly dissipated with propagation. The retainer stem which is below the solidified gel plug 22 forms an integral part of the canister when it is suspended into the wellbore from a location at or above the ground level.

Often, depending upon the kind of propellant used, it will be necessary to increase the density of the pumpable gel to obtain the desired stability and rigidity therein. To accomplish this a solid non-reacting material can be added to the pumpable gel mixture. Preferred non-reacting solid materials include solid rock salt, calcium carbonate, and suitably crushed mollusk shells, such as oyster shells.

Other gel mixtures can be used to obtain the desired stability and rigidity. A preferred mixture used to obtain the desired stability and rigidity, for example, is a mixture of hydropropyl guar cross linked with transitional metals and ions thereof. The purpose of the transitional metal ions is to provide increased strength, stability and rigidity for the gel plug stem 22.

Hydropropyl guar is placed into the gel mixture in an amount of from about 0.70 to about 10.0 weight percent of said mixture. As preferred, hydropropyl guar is placed in said mixture in about 7.2 percent by weight of said mixture.

Metallic ions which can be used in the puumpable gel mixture include titanium, zirconium, chromium, antimony and aluminum. The concentration of these transitional metals in the pumpable gel fluid will of course vary depending upon the requirements for the particular propellant being used and the nature of the wellbore and formation into which the canister containing the propellant is placed. Although the exact amounts of the metals required will vary depending on the particular application, it is anticipated that the metals should be included within the pumpable gel fluid in amounts of from about 0.005 weight percent to about 0.50 weight percent, preferably about 0.01 weight percent of said fluid.

When using propellants to generate the desired fracturing pressure, it is often desirable to have a gel stem plug 22 which will withstand a temperature range from about 300° F. to about 450° F. for from about 0.5 of a day to about 4 days. A thermally stable solid gel plug stem 22 can be obtained by mixing into the pumpable gel mixture a chemical known as an oxygen scavenger (such as sodium thiosulfate or short chain alcohols such as methanol, ethanol, and isopropanol), preferably sodium thiosulfate. The concentration of the oxygen scavenger utilized, of course, will depend upon the thermal stability desired to be obtained for the gel plug stem 22. However, as preferred, it is anticipated that the concentration of the oxygen scavenger in the pumpable gel mixture will be from about 0.10 percent by weight to about 0.75 percent by weight, preferably 0.50 percent by weight.

Figure 2:
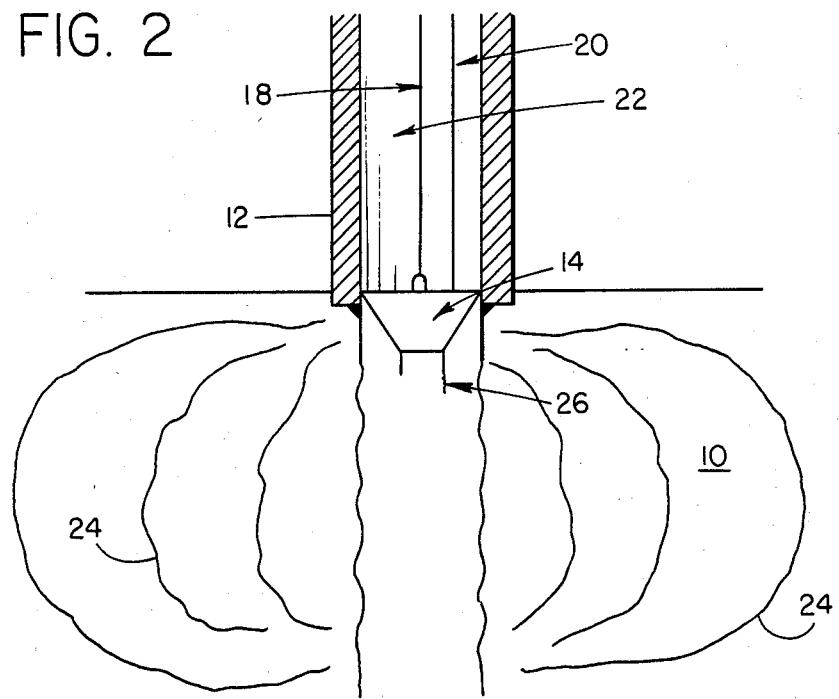
FIG. 2 is a graphic representation of the gel plug and canister containing the propellant after ignition.

Upon ignition of the propellant, heat and pressure is released within the wellbore and into the formation which expands into the formation 10 causing additional fracturing. As shown in FIG. 2, this heat and pressure produced at a controlled rate causes a fracturing of the hydrocarbonaceous producing formation 10. Fracturing of the formation is indicated by lines 24 in FIG. 2. Upon ignition, the heat and pressure created by the propellant causes a total or partial disintegration of the canister 26 which contained the propellant. However, as shown in FIG. 2, the retrieval cable 18 and ignition line 20 along with the retainer stem plug 14 remain intact. In order to maintain the productive level of the formation and keep this debris from entering into the wellbore, it is desirable to have a means for removing the gel plug stem 22 which would not cause the debris to fall within the wellbore 12.

To accomplish this, several variations are provided for. One variation, which can be utilized to facilitate removal of the gel plug stem 22 from wellbore 12 is to form a solid gel stem plug 22 containing a gel breaker. This gel breaker, included in the gel mixture, is selected from a group of chemical compounds which can break down the solid gel at temperatures of less than from about 60° F. to about 250° F. Generally this breakdown will occur within from about 2 hours to about 24 hours depending upon type and concentration of breaker added. Chemicals satisfactory for use as gel breakers, and which are incorporated into the gel mixture, include enzymes and oxidizing agents, suitable for breaking down the solid gel (such as sodium persulfate). Other gel breakers sufficient for this purpose are discussed in U.S. Pat. No. 4,265,311 issued to Ely on May 5, 1981, which is hereby incorporated by reference. These chemicals are readily available from chemical suppliers and with the exception of enzyme breakers are sold under their chemical names. Enzyme breakers can be obtained from oil field service companies. The concentration of the gel breaker incorporated into the gel mixture will vary from about 0.01 weight percent to about 0.10 weight percent, preferably about 0.05 weight percent of the gel mixture. Although the temperature upon ignition in the wellbore may generally exceed 150° F., the gel plug stem 22 will remain intact during the generation and dissipation of energy after ignition of the propellant. Upon cooling to a temperature of from about 60° F. to about 150° F., the gel breaker will breakdown the solid gel causing it to liquify which will facilitate removal of adhering debris, retainer stem 14, along with the retrieval cable 18, and the ignition line 20.

Another method for breaking the gel is to contact the solidified gel with a mineral acid after ignition of the propellant and lapse of a suitable or desired time interval. In those instances where it is undesirable to have a gel breaker incorporated into the gel mixture to remove the solid gel plug stem 22, it is preferred to use hydrochloric acid of a strength sufficient to solubilize the solid gel stem 22 without attacking retrieval cable 18, ignition wire 20, or retainer for stem 14. Hydrochloric acid, and acids similar thereto, can be used to breakdown the solid gel on contact. Hydrochloric acid of a concentration of about 10 percent to about 28 percent preferably about 15 percent, by volume of solution, will generally be sufficient for this purpose. Although hydrochloric acid has been mentioned, other similar mineral acids and strong organic acids may be employed depending upon their availability, as is known to those skilled in the art.

In one example of the practice of this invention, a slurry is formed with 1,000 gallons of water. This slurry comprises about 40 pounds of base gel such as hydroxypropyl guar gum which forms a hydrate in the water. To this mixture is added about 600 pounds of chemically treated hydroxypropyl guar gum which has delayed hydration or thickening qualities. Approximately 20 pounds of a buffer or catalyst suitable to obtain the desired pH and reaction time is added to this mixture. Cross-linking agents, such as bromates and chromates, are then added in an amount of about 20 pounds. Forty-two pounds of sodium thiosulfate, an oxygen scavenger, is then added to the mixture. This gel mixture is pumped into the formation above the retainer stem 14. After solidification of the mixture and ignition of the propellant, the cooled gel stem is removed by contacting it with 15 volume percent of hydrochloric acid in an amount sufficient to solubilize the gel stem.

In another example of the practice of this invention, a mixture is made as above. Additional components are placed into the mixture. About 420 pounds of crushed oyster shells are next added to the mixture. Titanium, in an amount of about 4 pounds, is added to the mixture. Approximately 170 pounds of potassium chloride is subsequently added to the mixture. Four pounds of sodium persulfate is added to the mixture and serves as a gel breaker. Upon solidifcation, the formed gel stem is capable of withstanding greater pressures upon ignition of the propellant. Upon cooling, after ignition of the propellant, the gel stem is liquefied by the sodium persulfate gel breaker.

As is understood by those skilled in the art, the composition of a gel stem will depend upon many variables including the propellant used and formation conditions. The above examples are mentioned as two possible variations among many others.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

What is claimed is:

1. An apparatus for sealing a wellbore after placing a canister containing a propellant into a wellbore where said seal forms a solidified gel capable of withstanding energy released from ignition of said propellant comprising:
   (a) a means for placing and containing a pumpable gel mixture at a predetermined level in said wellbore where said means for containing said pumpable mixture forms an integral part of said canister which is suspended into said wellbore from a position at or above the ground level; and
   (b) a means for pumping said gel mixture into the wellbore above the means for containing the pumpable mixture which mixture becomes a solid sufficient to withstand the energy released from an ignited propellant, including heat and pressure.

2. The apparatus as recited in claim 1 where in means (a) a solid non-reactant material is added to the pumpable gel mixture in an amount sufficient to increase the density of the pumpable gel, and said non-reactant material is a material selected from the group consisting of rock salt and calcium carbonate which non-reactant material gives stability and rigidity to said apparatus.

3. The apparatus as recited in claim 1 where in means (b) said gel mixture solidifes after from about 2 to about 4 hours into a stable and rigid gel.

4. The apparatus as recited in claim 1 where in means (b) the gel mixture forms a stable and rigid solid sufficient to withstand pressures generated upon ignition from about 10,000 psig to about 80,000 psig.

5. The apparatus as recited in claim 1 where in means (b) said solid becomes stable, rigid, and is able to withstand heat generated upon ignition greater than about 1,000° F.

6. The apparatus as recited in claim 1 where in means (b) the gel mixture becomes a stable, rigid solid and is made thermally stable for temperatures of from about 350° F. to about 450° F. for at least about 0.5 of a day to about 4 days.

7. The apparatus as recited in claim 1 where in means (a) a gel breaker is added to the pumpable gel mixture in an amount sufficient to breakdown the solid gel in step (b) at temperatures of less than from about 60° F. to about 250° F. within less than about 2 hours to about 24 hours thereby causing said solid gel to become liquid.

8. The apparatus as recited in claim 1 where in means (b) hydrochloric acid in a concentration of from about 10.0 percent to about 28.0 percent by volume of solution is contacted with said solid gel whereby said solid gel liqufies to facilitate its removal from the wellbore.

9. The apparatus as recited in claim 1 where in means (b) said gel mixture contains hydropropyl guar cross linked with ions of a transitional metal where the metal is a member selected from the group consisting of titanium, zirconium, chromium, anitmony and aluminum thereby making an apparatus of increased strength, stability and rigidity.

10. The apparatus as recited in claim 9 wherein said transitional metal is included within said pumpable gel mixture in an amount of from about 0.005 weight percent to about 0.50 weight percent of said mixture thereby making an apparatus of increased strength, stability, and rigidity.

11. The apparatus as recited in claim 1 where in means (b) hydropropyl guar is contained in the gel mixture in an amount of from about 0.70 weight percent to about 10.0 weight percent of said mixture which causes said apparatus to become rigid.

12. The apparatus as reoited in claim 1 wherein in means (b) an oxygen scavenger is placed into said gel mixture thereby making said apparatus thermally stable, and where said oxygen scavenger is a material selected from the group consisting of sodium thiosulfate and a short chain alcohol.

13. The apparatus as recited in claim 1 where in means (b) an oxygen scavenger is placed into said gel mixture in a concentration of from about 0.10 percent by weight to about 0.75 percent by weight of said mixture thereby making said apparatus thermally stable.

14. The apparatus as recited in claim 1 where in means (b) said gel mixture has a gel breaker incorporated into said gel mixture thereby causing said solid gel to liquefy.

15. The apparatus as recited in claim 1 where in means (b) said gel mixture contains a gel breaker which can break down said solid gel at temperatures less than from about 60° F. to about 250° F. within from about 2 to about 24 hours thereby causing said solid gel to liquefy.

16. The apparatus as recited in claim 1 where in means (b) said gel mixture contains a gel breaker capable of breaking down said solid gel and cause said solid gel to liquefy, where said gel breaker is a material selected from the group consisting of an enzyme and an oxidizing agent.

* * * * *